(12) United States Patent
Chan et al.

(10) Patent No.: US 8,686,345 B2
(45) Date of Patent: Apr. 1, 2014

(54) STANDBY CIRCUIT

(75) Inventors: Chun-Kong Chan, New Taipei (TW); Chin-Nan Lai, New Taipei (TW)

(73) Assignee: Lien Chang Electronic Enterprise Co., Ltd., New Taipei (TW)

( * ) Notice: Subject to any disclaimer, the term of this patent is extended or adjusted under 35 U.S.C. 154(b) by 307 days.

(21) Appl. No.: 13/207,520

(22) Filed: Aug. 11, 2011

(65) Prior Publication Data
US 2013/0037701 A1      Feb. 14, 2013

(51) Int. Cl.
*H01J 40/14*      (2006.01)

(52) U.S. Cl.
USPC .................. 250/216; 250/214 R; 315/192

(58) Field of Classification Search
USPC .............. 250/216, 214 R, 214 D, 551, 552; 315/151, 192, 201, 210, 291, 294; 257/88, E33.055
See application file for complete search history.

(56) References Cited

U.S. PATENT DOCUMENTS

2007/0025041 A1*    2/2007   Nakayama ...................... 361/92
2010/0072494 A1*    3/2010   Lee et al. ........................ 257/88

\* cited by examiner

*Primary Examiner* — Kevin Pyo
(74) *Attorney, Agent, or Firm* — Li & Cai Intellectual Property (USA) Office

(57) ABSTRACT

The present invention discloses a standby circuit. The standby circuit is coupled to an electric device for providing a standby voltage to the electric device when the electric device is not turned on. The standby circuit includes a light emitting module and an energy converter. The light emitting module receives an AC current and is driven by the AC current to generate light. The energy converter receives the light generated by the light emitting module and converts the light into the standby voltage. Therefore, the present invention can simplify the design of traditional standby circuit in a television.

2 Claims, 2 Drawing Sheets

STANDBY CIRCUIT

BACKGROUND OF THE INVENTION

1. Field of the Invention

The present invention relates to a standby circuit, and more particularly, to a standby circuit utilizing solar panels for generating a standby voltage.

2. Description of Related Art

As technology progresses, various kinds of electric devices are weeding out the old and bringing forth the new constantly, thereby making our life more convenient and comfortable. In order to activate or remotely control electric device at any moment, a standby circuit is usually installed within the electric device for keeping the electric device in standby state so as to provide a standby voltage to the electric device when the electric device is turned off. For example, a TV is powered by a power system which can provide 110V AC power, the standby voltage of the TV, however, needs 3.5V DC power. Therefore, an appropriate standby circuit is required to convert the AC power into DC power and reduce the AC voltage so as to generate the necessary rectified DC standby voltage.

Traditionally, the standby circuit of the TV usually applies a pulse width modulation (PWM) circuit to convert the AC power into DC power in the first instance, reduces the voltage of said DC power with a transformer, then rectifies the reduced DC power to generate a small and stable standby voltage by applying rectifier diodes. However, the demand for thinner TV drives manufacturers to create a new standby circuit without using the large transformer and the rectifier diodes, and this type of new standby circuit is a popular research target that aims to replace traditional PWM circuit, transformer, and rectifier diodes.

SUMMARY OF THE INVENTION

One particular aspect of the present invention is to provide a standby circuit which can replace and simplify the design of a traditional standby circuit of a display device. The provided standby circuit can convert an AC power into a small DC power without requiring the combination of PWM circuit, transformer, and rectifier diodes.

In order to achieve the above-mentioned advantages, the present invention provides a standby circuit. The standby circuit is coupled to an electric device for providing a standby voltage to the electric device when the electric device is not turned on. The standby circuit includes a light emitting module and an energy converter. The light emitting module receives an AC current and is driven by the AC current to generate light. The energy converter receives the light generated by the light emitting module and converts the light into the standby voltage. Therefore, the present invention can simplify the design of traditional standby circuit in a television.

According to an embodiment of the present invention, the light emitting module comprises a first light emitting unit and a second light emitting unit, the first and second light emitting units are respectively configured to receive a positive component and a negative component of the AC current. Additionally, the energy converter can be a solar panel, the first light emitting unit and the second light emitting unit can comprise at least a LED respectively, the standby circuit can further comprise a coupling capacitance, a first energy storing capacitance, and a second energy storing capacitance; the coupling capacitance is coupled with the first light emitting unit and the second light emitting unit, the first energy storing capacitance is coupled with both ends of the first light emitting unit, and the second energy storing capacitance is coupled with both ends of the second light emitting unit.

To sum up, the standby circuit of the present invention does not need to apply the combination of PWM circuit, transformer, and rectifier diodes. In contrast, the standby circuit of the present invention can provide AC power to the light emitting module directly for generating light, and then the energy converter receives and converts the light into small scaled DC power. The design of the traditional standby circuit of the display device can be simplified accordingly.

To further understand the techniques, means and effects the present invention takes for achieving the prescribed objectives, the following detailed descriptions and appended drawings are hereby referred, such that, through which, the purposes, features and aspects of the present invention can be thoroughly and concretely appreciated. However, the appended drawings are provided solely for reference and illustration, without any intention that they be used for limiting the present invention.

DETAILED DESCRIPTION OF THE PREFERRED EMBODIMENTS

[Standby Circuit Embodiment]

Figure 1:
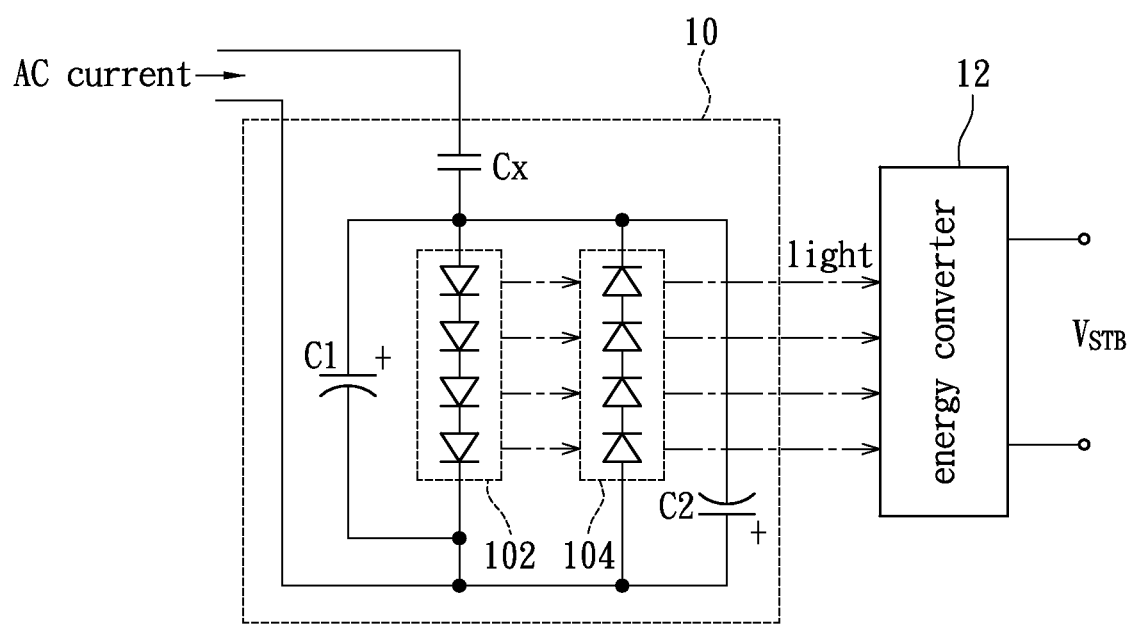
FIG. 1 shows a block diagram of the standby circuit according to an embodiment of the present invention.

Referring to FIG. 1, FIG. 1 shows a block diagram of the standby circuit according to an embodiment of the present invention. As shown in FIG. 1, standby circuit 1 includes a light emitting module 10 and an energy converter 12, the light emitting module 10 is coupled with an AC power source, and the energy converter 12 is coupled with an electric device (not shown in FIGs) to provide the electric device with a standby voltage $V_{STB}$. In addition, said electric device could be, but not limited to, a display device. Functions and connective relationship of components of the standby circuit 1 are described as follow.

The light emitting module 10 is configured to receive an AC current from the AC power source and be driven by the AC current to generate light. The AC current can be provided to the light emitting module 10 by a driving circuit (not shown in FIG. 1), and the driving circuit is configured to drive all light emitting elements to generate light. In practice, the light emitting module 10 can include a first light emitting unit 102 and a second light emitting unit 104, both of the first light emitting unit 102 and the second light emitting unit 104 can respectively include a plurality of LEDs, light bulbs, or any device adapted to emit light. Of course, in order to lower manufacturing costs, said light emitting module 10 can be a status light or a backlight module originally disposed inside the display device, so that no extra arrangement is needed. For example, the light emitting module 10 of this embodiment can be, but not limited to, a plurality of LEDs.

As mentioned above, the first light emitting unit 102 and the second light emitting unit 104 can respectively include part of the plurality of LEDs, which are electrically connected in series, and the first light emitting unit 102 and the second light emitting unit 104 can be electrically connected in parallel. Of course, person skilled in the art can adaptively adjust the amount of the LEDs electrically connected to the first light emitting unit 102 or the second light emitting unit 104. For example, if each of the LEDs can provide enough lumen emitted to the energy converter 12, the first light emitting unit 102 and the second light emitting unit 104 can respectively include only one LED; if each of the LEDs, however, can not provide enough lumen emitted to the energy converter 12, the first light emitting unit 102 and the second light emitting unit 104 still need to respectively occupy certain amount of LEDs, such that each of the first light emitting unit 102 and the second light emitting unit 104 as a whole can provide enough lumen emitted to the energy converter 12. Furthermore, in order to reduce power consumption and lower manufacturing costs, white light LEDs can be preferably used in the light emitting module 10 to provide more lumen.

In view of the path of currents, since each LED can only be conducted in one phase, i.e. conducted by positive or negative current, the LEDs of the first light emitting unit 102 and the second light emitting unit 104 shall be connected oppositely to provide different current paths within a single period of the AC current. In other words, when the first light emitting unit 102 is configured to receive positive (or negative) current, the second light emitting unit 104 shall be configured to receive negative (or positive) current accordingly. In practice, the merit of the present invention is that the first light emitting unit 102 and the second light emitting unit 104 can provide different paths for the positive and negative current of the AC current respectively, and this embodiment is not limiting whether the first light emitting unit 102 can be conducted in positive or negative phase of the AC current, nor that the second light emitting unit 102 can be conducted in positive or negative phase of the AC current. If the light emitting module 10, however, can only be conducted in positive or negative phase of the AC current, i.e. lacking one of the first light emitting unit 102 and the second light emitting unit 104, then the light emitting module 10 is still able to work. In one preferred embodiment, the light emitting module 10 is configured to receive both of the positive and negative phases of the AC current to utilize the AC current effectively.

In addition, the light emitting module 10 can further include a coupling capacitance Cx, a first energy storing capacitance C1, and a second energy storing capacitance C2. The coupling capacitance Cx is coupled with the first light emitting unit 102 and the second light emitting unit 104, the first energy storing capacitance C1 is coupled with both ends of the first light emitting unit 102, and the second energy storing capacitance C2 is coupled with both ends of the second light emitting unit 104. Person skilled in the art can realize that the AC current varies with time and is not a constant value, and light-emitting efficiency of the LED is closely related to the input current. In order to stabilize the light emitted by the LED, the coupling capacitance Cx, the first energy storing capacitance C1, and the second energy storing capacitance C2 are required to collocate with the first light emitting unit 102 and the second light emitting unit 104. For example, the coupling capacitance Cx is 1 µF, and each of the first and second energy storing capacitance C1, C2 is 47 µF for temporarily storing 50V of electricity.

Still referring to FIG. 1, the energy converter 12 is configured to receive the light generated by the light emitting module 10 and convert the light into the standby voltage $V_{STB}$. In practice, the energy converter 12 can be a solar panel or other photovoltaic materials, and the surface of the energy converter 12 adapted to receive the light shall squarely face the LEDs of the light emitting module 10. Thus, the light generated by the LEDs can enter the energy converter 12 (i.e. solar panel) vertically to achieve better photovoltaic conversion efficiency. In general, solar panels manufactured by different processes or specs might not be able to generate the same DC voltage, even if the lumen received per area is exactly the same. Therefore, the spec of the energy converter 12 shall be carefully chosen to collocate with the lumen generated by the light emitting module 10 for providing standby voltage $V_{STB}$ that is stable.

Further, the energy converter 12 not only can receive the light generated by the light emitting module 10; that is, the present invention does not limit the amount of the energy converter 12, and does not limit where the energy converter 12 is placed either. For example, the energy converter 12 of the present invention can further receive light in the surroundings to generate the standby voltage $V_{STB}$. In practice, when a plurality of the energy converters 12 are arranged, one of the energy converters 12 can be placed inside the display device, and the rest of the energy converters 12 can be placed outside the display device to receive light in the surroundings.

Moreover, the standby circuit 1 of the present invention can further include an optical component (not shown), disposed around the light emitting module 10, for guiding light to the energy converters 12. In practice, the optical component can be a speculum or other light-guiding materials for guiding light that is not emitted towards the energy converters 12. The optical component can reflect or refract the light to the surface of the energy converters 12 to enhance the photovoltaic conversion efficiency.

[Display Device Embodiment]

Figure 2:
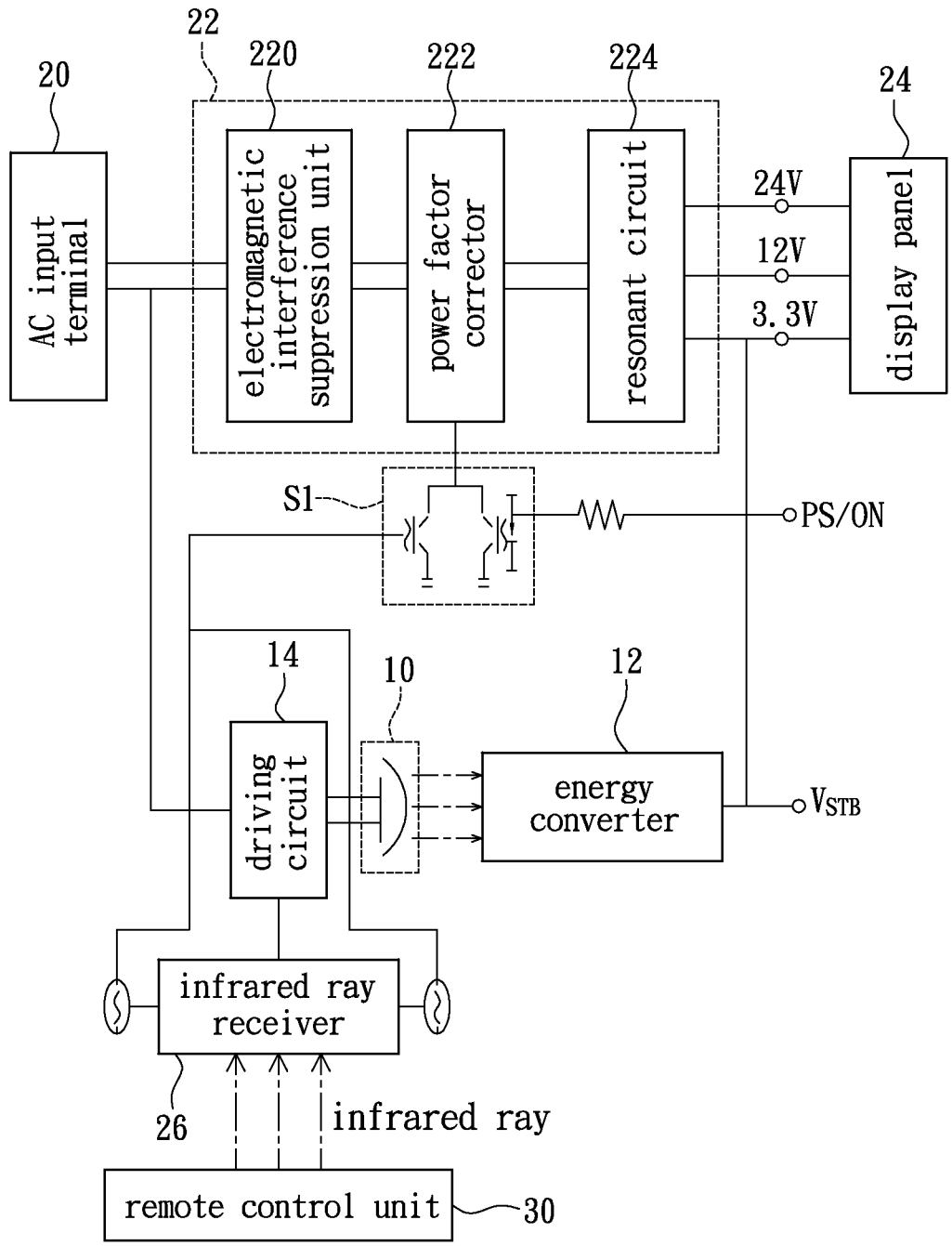
FIG. 2 shows a block diagram of the display device applying the standby circuit shown in FIG. 1 according to the embodiment of the present invention.

Referring to FIG. 1 and FIG. 2, FIG. 2 shows a block diagram of the display device applying the standby circuit shown in FIG. 1 according to the embodiment of the present invention. As shown in FIGs, a display device 2 includes a light emitting module 10, an energy converter 12, a driving circuit 14, an AC input terminal 20, a power supply circuit 22, a display panel 24, and an infrared ray receiver 26, wherein the light emitting module 10, the energy converter 12, and the driving circuit 14 can form the aforementioned standby circuit 1, as shown in standby circuit embodiment. Furthermore, the power supply circuit 22 can include an electromagnetic interference (EMI) suppression unit 220, a power factor corrector 222, and a resonant circuit 224. In practice, the display device 2 can be a TV, a LCD, or other appropriate displayers. Functions and connective relationship of components of the display device 2 are described as follow.

The display device 2 is coupled with electric utility system through the AC input terminal 20 for outputting an AC current. The EMI suppression unit 220 is configured to suppress the EMI noise caused by the received AC current. The power factor corrector 222 is configured to enhance the stability and power consumption efficiency of the whole system, and the present invention does not limit whether the power factor corrector 222 is a passive power factor corrector or an active power factor corrector. The resonant circuit 224 can be a LLC resonant circuit which combines a half-bridge or a full-bridge convertor with a serial resonant circuit. The display panel 24, coupled with the resonant circuit 224, is configured to show images. Of course, the resonant circuit 224 can not only be configured to drive the display panel 24, but also can be configured to drive the load behind the display device 2.

Furthermore, the infrared ray receiver 26 is configured to receive a remote control signal from users, i.e. the users can use a remote control unit 30 to emit a starting signal in infrared ray to the infrared ray receiver 26 for turning on the display device 2. The remote control unit 30 demonstrates one mean to turn on/off the display device 2, person skilled in the art can replace the remote control unit 30 with any equivalent device adaptively.

In practice, the display device 2 is usually powered by 110V AC power. When the display device 2 is coupled with electric utility system through the AC input terminal 20 and the infrared ray receiver 26 does not receive the starting signal, then the received AC power flow through the driving circuit 14 to drive the light emitting module 10. The driven light emitting module 10 can emit light toward the energy converter 12 for generating the standby voltage $V_{STB}$ which provides standby power for the load behind the display device 2, and thereby keeping the load behind the display device 2 quickly operable in standby status.

When the remote control unit 30 is operated and the infrared ray receiver 26 receives a starting signal, the switch S1 is turned on and makes the power status of the display device 2 switch to "ON". Then, the resonant circuit 224 can provide a plurality of voltages (i.e. 24V, 12V, and 3.3V) to the load behind the display device 2, and the standby voltage $V_{STB}$ can be used to power the load operated under this voltage level when the power supply is stable. Thus, the standby voltage $V_{STB}$ can be used properly without wasting power. Alternatively, when the remote control unit 30 is operated and the infrared ray receiver 26 receives the starting signal, the driving circuit 14 can shut down the light emitting module 10 correspondingly, and the load behind the display device 2 can be powered by the resonant circuit 224.

To be noted, the present invention only shows part of components of the display device 2, and it does not mean that the display device 2 can only have such components. For example, the display device 2 can further include a pulse suppression unit, a bridge rectifier, a power converting circuit, and capacitances for providing power to the power factor corrector 222 or to the power converting circuit, person skilled in the art can design the display device 2 adaptively to fulfill different specs.

In conclusion, the standby circuit of the present invention provides the AC power to the light emitting module directly for generating light, and then the energy converter receives and converts the light into small scaled DC power. In contrast, the present invention does not need to use traditional large PWM circuit, transformer, and rectifier diodes, and the new standby circuit can replace and simplify the design of a traditional standby circuit of a display device.

The above-mentioned descriptions merely represent the preferred embodiments of the present invention, without any intention or ability to limit the scope of the present invention which is fully described only within the following claims. Various equivalent changes, alterations or modifications based on the claims of present invention are all, consequently, viewed as being embraced by the scope of the present invention.

What is claimed is:

1. A standby circuit, coupled with an electric device, for providing a standby voltage to the electric device when the electric device is turned off, the standby circuit comprising:
   a light emitting module for receiving an AC current and being driven by the AC current to generate light, wherein the light emitting module comprises a first light emitting unit and a second light emitting unit;
   an energy converter for receiving the light generated by the light emitting module and converting the light into the standby voltage;
   a coupling capacitance is coupled with the first light emitting unit and the second light emitting unit;
   a first energy storing capacitance is coupled with both ends of the first light emitting unit; and
   a second energy storing capacitance is coupled with both ends of the second light emitting unit;
   wherein the first light emitting unit and the second light emitting unit respectively comprises at least a LED.

2. The standby circuit as claimed in claim 1, the first light emitting unit and the second light emitting unit are respectively configured to receive a positive component and a negative component of the AC current.

* * * * *